United States Patent [19]

Lindae et al.

[11] Patent Number: 4,800,467

[45] Date of Patent: Jan. 24, 1989

[54] DIMMED HEADLIGHT, PARTICULARLY FOR MOTOR VEHICLES

[75] Inventors: Gerhard Lindae, Leonberg; Richard Loewe, Gerlingen; Peter Perthus, Stuttgart, all of Fed. Rep. of Germany

[73] Assignee: Robert Bosch GmbH, Stuttgart, Fed. Rep. of Germany

[21] Appl. No.: 58,351

[22] Filed: Jun. 4, 1987

[30] Foreign Application Priority Data

Jun. 20, 1986 [DE] Fed. Rep. of Germany ....... 3620789

[51] Int. Cl.⁴ .............................................. B60Q 1/00

[52] U.S. Cl. ...................................... 362/61; 362/297; 362/309; 362/303; 362/310

[58] Field of Search ................. 362/61, 303, 310, 311, 362/307, 83, 296, 297, 309

[56] References Cited

U.S. PATENT DOCUMENTS 1,775,619 9/1930 Whalen ................................ 362/61
4,517,630 5/1985 Dieffenbach et al. .............. 362/309

FOREIGN PATENT DOCUMENTS 2498297 7/1982 France ............................... 362/297

*Primary Examiner*—James C. Yeung
*Attorney, Agent, or Firm*—Michael J. Striker

[57] ABSTRACT

A dimmed headlight for a motor vehicle has a vertical center section defining an ellipse whose outer portion transits into an apex portion. The apex portion defines an inner focal point and an outer focal point and the upper elliptical portion defines a focal point coinciding with said inner focal point and a plurality of outer focal points located on the long axis of the ellipse behind the outer focal point of the apex portion when viewed in the direct of reflected light rays. An objective is arranged before the last one of the outer focal points to collect the reflected light rays. The lower part of the reflector contains a light reflecting member and a diaphragm extending transversely to the long axis in the outer focal point of the apex portion. The light reflecting member is oriented such as to reflect downwardly directed light rays from the light source against an upper part of the apex portion. In this manner, light intensity of reflected beam is increased and an improved illumination of the driveway before the vehicle is obtained.

3 Claims, 1 Drawing Sheet

DIMMED HEADLIGHT, PARTICULARLY FOR MOTOR VEHICLES

BACKGROUND OF THE INVENTION

The present invention relates to a dimmed headlight for motor vehicles including a reflector whose vertical center section is a partial ellipse and including a light source arranged in the region of the inner focal point of the ellipse, a diaphragm arranged in the reflector to create a dark-light limit line in the transmitted light beam, and an objective power projecting dimmed light beam on the driveway.

In conventional headlights of this kind, the objective is very small in comparison with the dispersion glass of the reflector and when the objective has rectangular shape, its height is extremely small. Light rays reflected from the apex section of the reflector are collected by the objective and form the light beam. However, light rays reflected from the upper section of the ellipsoid reflector which adjoins the apex section do not reach the objective. In addition, the diaphragm stops a part of light rays reflected from the lower half of the reflector.

As a consequence, in prior art reflectors the transmission of light emanating from the light source is impaired and the illumination of the driveway, particularly immediately before the motor vehicle, is inferior.

SUMMARY OF THE INVENTION

It is, therefore, a general object of the present invention to eliminate the aforementioned disadvantages. In particular, it is an object of this invention to provide an improved dimmed headlight which by technically simple means substantially avoids these disadvantages by utilizing almost the entire amount of light emitted by the light source for illuminating the driveway, particularly immediately before the vehicle. In keeping with these objects and with others which will become apparent hereafter, one feature of this invention resides in principle in shaping the ellipsoid reflector in such a manner that the outer focal point of the upper ellipsoid section is continuously shifted in the direction of propagation of the light beam, that means the large axis of the ellipsoid is continuously prolongated so that the section of the ellipsoid delimiting the light outlet opening has the largest half axis. Another feature of this invention resides in the reflection of a path of light rays emitted by the light source toward the lower half of the reflector which is screened by the diaphragm, against the non-screened upper half, where the part of rays is utilized for illumination.

In a preferred embodiment of this invention, the light reflector member for redirecting the light rays from the lower toward the upper half of the reflector is in the form of two hemispheres whose center points are offset to the left and to the right with respect to a spiral filament of the light source, thus avoiding the concentration of temperature in the heating spiral. Preferably, the hemispheres generate virtual images of the heating spiral to the left and to the right of the center points of respective hemispherical parts of the reflecting member, thus improving the illumination of the driveway.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 1:
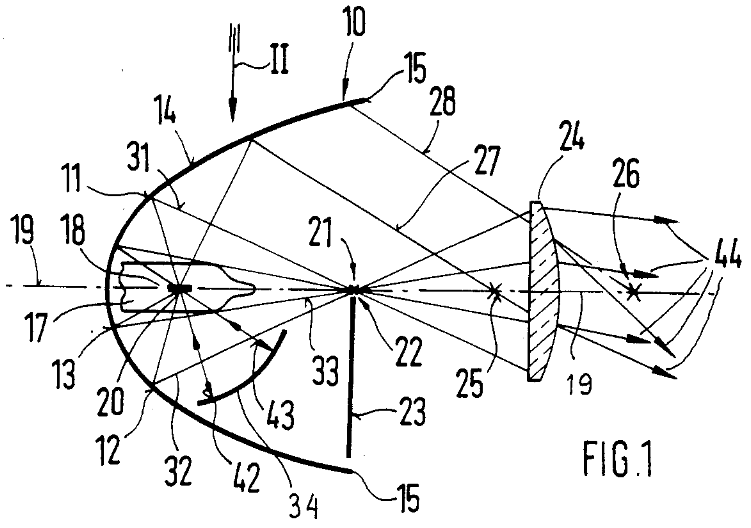
FIG. 1 shows schematically a vertical center section of the headlight of this invention with indicated borderline light rays.

A dimmed headlight for motor vehicles has an ellipsoid reflector 10 defining an apex region 13 extending between points 11 and 12, an upper section 14 between the point 11 and an edge 15 of the light outlet opening, and a lower section 16 between the point 12 and the lower edge 15. An incandescent light 17 has a spiral filament 18 arranged coaxially on the optical axis 19 which coincides with the cross-section of horizontal and vertical planes of the reflector 10. The contour of the vertical center section of the apex 13 is a part of an ellipse whose inner focal point 20 is in the region of the spiral filament 18 and whose outer focal point 21 is situated in the region of an optically effective edge 22 of a diaphragm 23. In the light outlet opening of the reflector, an objective 24 is arranged on the optical axis. Light rays 31 and 33 reflected from the apex region 13 intersect at the outer focal point 21 of the ellipse and impinge upon the objective 24. The diaphragm 22 is located in the lower half of the reflector to block-off a part of the light rays propagating in the lower half. The edge 22 of the diaphragm which extends transversely to the optical axis 19 creates a dark-light boundary line in the downwardly transmitted dimmed light beam 44 illuminating the driveway close to the motor vehicle.

The apex region 13 transmits into the upper ellipsoidal section 14 of the reflector whose center section forms part of an ellipse whose one focal point coincides with the inner focal point 20 of the apex region and whose outer focal points 25 and 26 are located on the optical axis before and behind the objective 24 when viewed in the direction of transmitted light beam 44. The upper ellipsoidal section 14 thus, reflects one beam of emitted rays 27 through the first outer focal point 25 and another beam of emitted rays 28 through the second outer focal point 26 whereby both light beams are collected by the objective 24. As mentioned before, the inner focal point of respective ellipsoidal parts constituting the upper section 14 coincides with the inner focal point 20 of the apex section 13.

Figure 2:
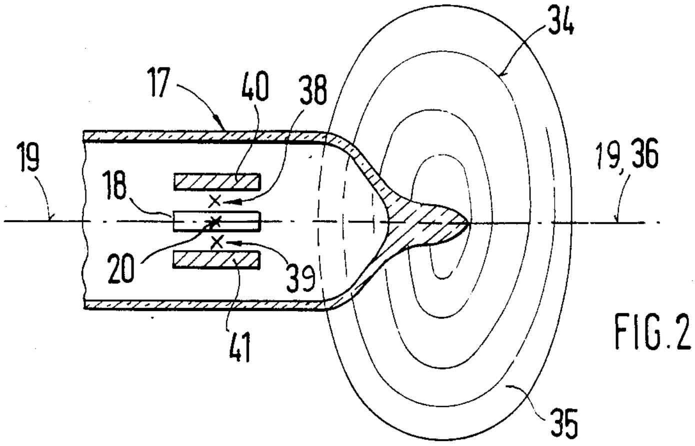
FIG. 2 illustrates a top view of a light reflecting member of FIG. 1, shown on an enlarged scale.

Referring to FIG. 2, the lower half of the reflector 10 before the diaphragm 23 encloses a light-reflecting member consisting of a left sphere segment 34 and a right sphere segment 35 symmetrically arranged relative to the vertical center plane 36 of the reflector. The center point 38 of the left sphere segment 34 is located to the left of the spiral filament 18 and the center point 39 of the right sphere segment 35 is to the right of the filament. The left sphere segment 34 generates a real image 40 of the part of the spiral filament which is situated to the left of the center point 38 and the right sphere segment 35 generates a corresponding real image 41 of the part of the filament situated to the right of the center point 39.

It will be seen from FIG. 1 that the downwardly directed light rays 42, 43 emitted by the spiral filament 18 are reflected by the reflecting member 34, 35 against the part of the apex section 13 above the optical axis and rereflected to the outer focal point 21 against the objective 24. Accordingly, the whole amount of light emitted by the light source is collected by objective 24 and directed downwardly as a transmitted dimmed light beam 44 on the driveway.

The horizontal center section of the reflector has the shape of a partial ellipse or parabola; the intermediate parts of the light reflecting surface between the vertical and horizontal center sections have a corresponding transient shape determined by computation.

While the invention has been illustrated and described as embodied in a specific example of a dimmed headlight for a motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A dimmed headlight for motor vehicles, comprising a reflector whose vertical center section delimits a partial ellipse having an apex portion defining an optical axis, an inner focal point and an outer focal point located in said optical axis, said apex portion transiting into an upper elliptical portion and a lower elliptical portion, said upper and lower elliptical portions having an inner focal point coinciding with said inner focal point of the apex portion, said upper elliptical portion being shaped such as to provide a plurality of outer focal points located on said optical axis behind said outer focal point of the apex portion when viewed in the direction of reflected light rays; a light source arranged in the region of said inner focal points; an objective arranged on said optical axis between said outer focal point of the apex portion and an outermost focal point of the upper elliptical portion to collect light rays reflected by said apex portion and the said upper elliptical portion; a diaphragm provided in a lower part of said reflector in the region below said outer focal point of the apex portion and extending transversely to said optical axis to block-off light rays propagating in said lower part of the reflector; and a light reflecting member provided within said lower part of the reflector before said diaphragm to reflect downwardly directed rays from said light source against a part of said apex portion situated above said optical axis.

2. A headlight as defined in claim 1, wherein said light source is an incandescent lamp having a spiral filament coaxial with said optical axis, said light reflecting member consisting of two sphere segments, one sphere segment being arranged to the left and the other sphere segment to the right with respect to a vertical center plane of the reflector, the left side sphere segment having a center point located to the left of said spiral filament, and the right side sphere segment having a center point located to the right of said filament.

3. A headlight as defined in claim 2, wherein said sphere segments generate images of said spiral filament, one of said images being located to the left and to the other to the right of the respective center points

* * * * *